(12) United States Patent
Bellagamba et al.

(10) Patent No.: US 9,674,079 B1
(45) Date of Patent: Jun. 6, 2017

(54) DISTRIBUTION LAYER REDUNDANCY SCHEME FOR COUPLING GEOGRAPHICALLY DISPERSED SITES

(75) Inventors: Patrice Bellagamba, Saint-Raphaël (FR); Nash Darukhanawalla, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/419,825

(22) Filed: Mar. 14, 2012

(51) Int. Cl.
*H04L 12/703* (2013.01)
*H04L 12/701* (2013.01)
*H04W 40/24* (2009.01)

(52) U.S. Cl.
CPC .............. *H04L 45/28* (2013.01); *H04L 45/00* (2013.01); *H04W 40/246* (2013.01)

(58) Field of Classification Search
CPC . H04L 45/28; H04L 12/4641; H04L 41/5012; H04L 47/125
USPC .......................................... 370/219–256, 392
See application file for complete search history.

(56) References Cited

U.S. PATENT DOCUMENTS

| | | | |
|---|---|---|---|
| 6,687,702 B2 * | 2/2004 | Vaitheeswaran et al. | |
| 7,719,959 B2 | 5/2010 | Shah et al. | 370/220 |
| 7,817,535 B2 * | 10/2010 | Pereira et al. | 370/216 |
| 8,243,591 B2 * | 8/2012 | Bou-Diab et al. | 370/225 |
| 2005/0147028 A1 * | 7/2005 | Na et al. | 370/217 |
| 2007/0189157 A1 | 8/2007 | Andrews et al. | 370/228 |
| 2008/0031263 A1 | 2/2008 | Ervin et al. | 370/397 |
| 2010/0182937 A1 | 7/2010 | Bellagamba | 370/256 |
| 2012/0014386 A1 * | 1/2012 | Xiong et al. | 370/392 |
| 2012/0033665 A1 * | 2/2012 | Jacob Da Silva et al. | 370/389 |

* cited by examiner

Primary Examiner — Jeffrey M Rutkowski
Assistant Examiner — Fangyan Deng
(74) Attorney, Agent, or Firm — Baker Botts L.L.P.

(57) ABSTRACT

In one embodiment, a plurality of first connections each couple a first distribution node of a first site to a respective access device. A second connection between the first distribution node and a first edge router is configured to not forward traffic associated with a first set of virtual local area networks (VLANs). It is determined whether the second distribution node is reachable from the first distribution node through the first edge router and a second edge router. The second distribution node is configured to forward traffic associated with the first set of VLANs to the second edge router. In response to a determination that the second distribution node is unreachable, the second connection is configured to forward traffic associated with the first set of VLANs. Traffic associated with the first set of one or more VLANs may be forwarded across the second connection to the first edge router.

17 Claims, 3 Drawing Sheets

DISTRIBUTION LAYER REDUNDANCY SCHEME FOR COUPLING GEOGRAPHICALLY DISPERSED SITES

TECHNICAL FIELD

The present disclosure relates generally to communications networking and more specifically to a distribution layer redundancy scheme for coupling geographically dispersed sites.

BACKGROUND

Virtualization technologies, such as server clustering and virtual-machine hypervisor may rely on the extension of virtual local area networks (VLANs) across geographically dispersed sites, such as data centers. One or more of these sites may utilize spanning tree protocol (STP) to implement a loop free topology within the site. However, STP does not perform well in large-scale networks and is generally not used to interconnect multiple sites.

Some sites may utilize flexlink (e.g., CISCO FlexLink) connectivity on one or more devices in place of STP. A flexlink may include a pair of layer 2 (referring to the Open Systems Interconnection (OSI) model) interfaces on a device. Such a configuration may provide layer 2 redundancy for a device without requiring STP on the device to ensure loop-free topology. Redundancy may be achieved by configuring one interface as a primary (active) interface and one interface as a backup (standby) interface where only the primary interface is active and forwards traffic. Flexlinks are typically implemented by devices at the access layer of a site.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Overview

According to one embodiment, a method includes providing a plurality of first connections that each couple a first distribution node of a first site to a respective access device of a plurality of access devices of the first site. Each access device is coupled to one or more hosts of the first site. A second connection between the first distribution node and a first edge router is configured to not forward traffic associated with a first set of one or more virtual local area networks (VLANs). The method further includes determining whether the second distribution node is reachable from the first distribution node through the first edge router and a second edge router. The second distribution node is configured to forward traffic associated with the first set of one or more VLANs to the second edge router. The second connection is then configured to forward traffic associated with the first set of one or more VLANs in response to a determination that the second distribution node is unreachable through the first edge router and the second edge router. The method further includes forwarding traffic associated with the first set of one or more VLANs across the second connection to the first edge router.

Certain embodiments of the disclosure may provide one or more technical advantages. A technical advantage of one embodiment is that virtual local area network (VLAN) traffic is efficiently transported from one site to another. Another technical advantage of one embodiment is that failures of a distribution node, a connection from the distribution node to an edge router, or the edge router are quickly detected. Another technical advantage of one embodiment is that a backup distribution node engages in traffic forwarding immediately after a failure associated with a primary distribution node is detected. Another technical advantage of one embodiment may be that management functions are performed by each of a plurality of distribution nodes, rather than an edge router coupled to the plurality of distribution nodes, thus allowing a network to scale efficiently. Another technical advantage may be that one distribution node of a pair may be the primary distribution node for a first set of VLANs and the backup distribution node for a second set of VLANs while the other distribution node of the pair may be the backup distribution node for the first set of VLANs and the primary distribution node for the second set of VLANs.

Certain embodiments of the disclosure may include none, some, or all of the above technical advantages. One or more other technical advantages may be readily apparent to one skilled in the art from the figures, descriptions, and claims included herein.

DESCRIPTION

Figure 1:
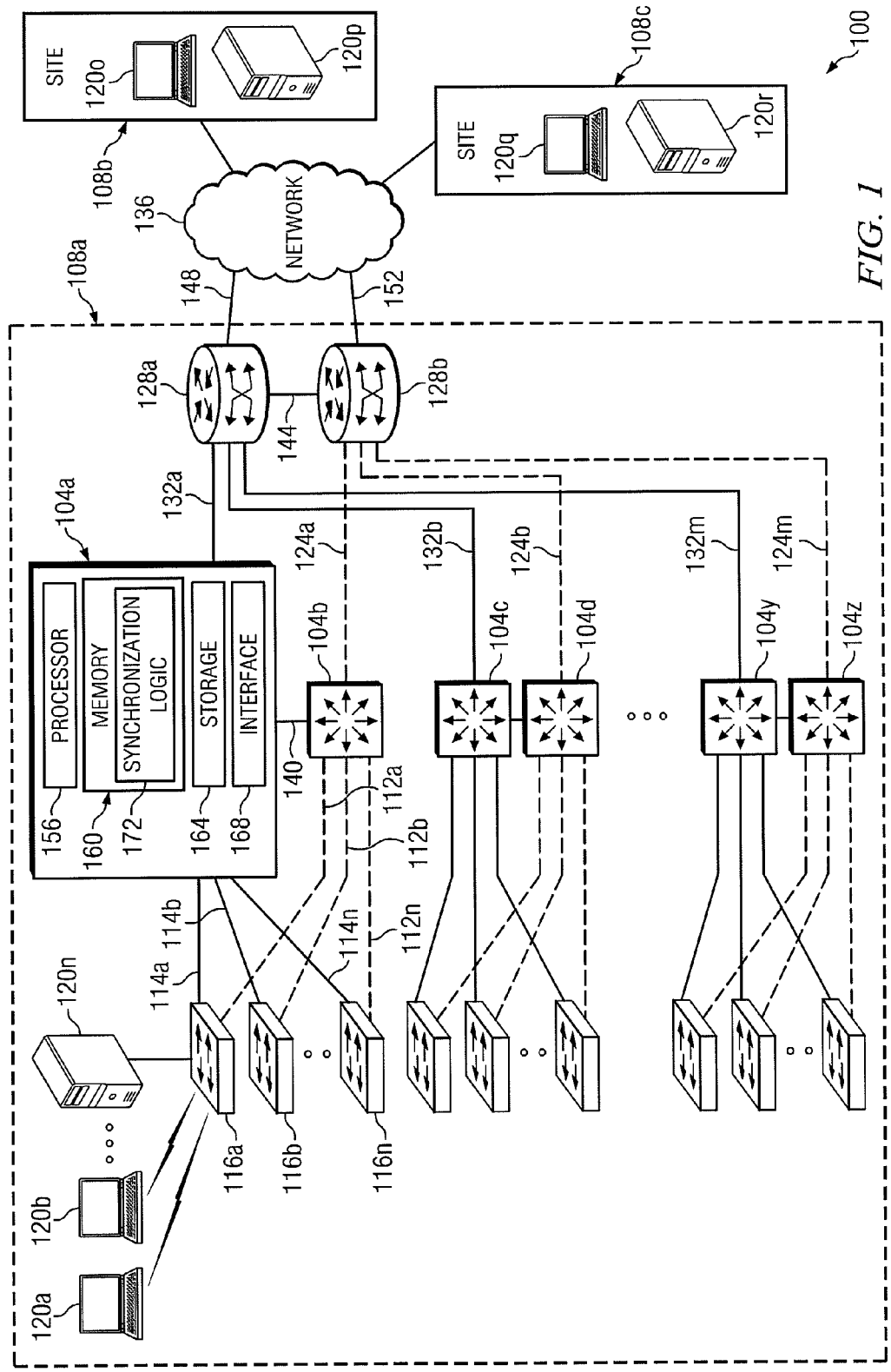
FIG. 1 depicts an example system comprising distribution node pairs that each implement a distribution layer redundancy scheme for coupling geographically dispersed sites.

FIG. 1 depicts an example system 100 comprising distribution node pairs that each implement a distribution layer redundancy scheme for coupling geographically dispersed sites 108. System 100 includes various sites 108 coupled through network 136. Site 108 may be any suitable group of computing and/or networking devices coupled together through the data link layer (Layer 2) of the Open Systems Interconnection (OSI) model or the link layer of the TCP/IP reference model (or similar layer). For example, site 108 may be a data center, a campus network, a carrier ethernet network, or other suitable group of networked computing devices. Site 108*a* includes hosts 120, access devices 116, distribution nodes 104, and edge routers 128. A layered concept may be used to describe the arrangement of site 108*a*. For example, access devices 116 reside in an access layer, distribution nodes 104 reside in a distribution layer (also known as an aggregation layer), and edge routers reside in a core layer of the site 108*a*.

In the embodiment depicted, a plurality of hosts 120 are coupled through a wired or wireless connection to access device 116*a*. System 100 may include any suitable number of hosts 120 that are each coupled to one or more access devices 116. A host 120 is a device capable of communicating with other hosts 120. For example, hosts 120 may each be a computing device such as a server, network component, personal computer, mobile device, storage device, or other appropriate computing device. Hosts 120 may include any collection of hardware, software, memory, and/or controlling instructions or logic operable to communicate with other hosts 120 in the same site 108a or a different site 108b or 108c. Each host 120 may be assigned one or more unique network addresses (at least with respect to a particular routing table), such as an Internet Protocol (IP) address or a unique Media Access Control (MAC) address (at least with respect to a particular VLAN) that identify the host 120.

Hosts 120 communicate with other hosts 120 by sending and receiving data link layer frames. A data link layer frame may be a data packet of the data link layer (Layer 2) of the OSI model or the link layer of the TCP/IP reference model. In various embodiments, a data link layer frame specifies a MAC address of the host 120 that is the source of the data link layer frame and a MAC address of the host 120 that is the destination of the data link layer frame. In particular embodiments, a data link layer frame conforms to an Ethernet frame standard such as an IEEE 802.3 standard.

In addition to communicating with other hosts 120 of the same site 108a using data link layer frames, a host 120a may communicate with one or more other hosts (such as hosts 120o-120r) at one or more sites (such as site 108b or 108c) using data link layer frames. Globalization, security, and disaster recovery considerations are driving divergence of business locations across multiple regions. In addition, organizations are looking to distribute workload between computers, share network resources effectively, and increase the availability of applications. As sites such as data centers grow in size and complexity, organizations are adopting server virtualization technologies to achieve increased efficiency and use of resources. In addition to providing resource optimization, virtualization strategies offer data protection that enables enterprises to build disaster recovery solutions and provide high availability, scalability, flexibility, and business continuity. Server virtualization technologies include High Availability Clustering which includes two or more servers that are each configured as active or standby deployed in geographically dispersed data centers. In the event of the loss of the data center or one of the servers, the server in another location would become active, thus providing access to the same set of applications/services and facilitating business continuity. Such solutions require the same IP address to be configured on both these servers (or any other number of additional servers deployed across multiple data centers), thus requiring the same IP subnet in physically separate data centers. This requires VLAN extension between sites, such as sites 108, such that hosts may communicate with other hosts of a different site using data link layer frames.

System 100 may also include any suitable number of access devices 116. Access devices 116 are operable to bridge traffic (e.g., data link layer frames) between hosts 120 and one or more distribution nodes 104. As an example, access device 116a may receive a data link layer frame from host 120a and forward the data link layer frame through distribution node 104a towards the eventual recipient host of the data link layer frame. As another example, access device 116a may receive a data link layer frame that is addressed to host 120a from distribution node 104a and forward the data link layer frame to host 120a. As yet another example, access device 116a may receive a data link layer frame from host 120a and forward the frame to host 120b.

Access device 116 may be any suitable switch. An access device 116 is operable to maintain wired or wireless connections with hosts 120 that facilitate communication between hosts 120 and the access device. Access device 116 may be coupled to any suitable number of hosts 120.

In the embodiment depicted, each access device 116 is coupled to a pair of distribution nodes 104. For example, access device 116a is coupled to distribution node 104a through connection 114a and distribution node 104b through connection 112a. As depicted, access devices 116b-116n may be coupled to distribution nodes 104a and 104b in a similar manner. Connections 112 and 114 may each represent one or more suitable media for transferring data between an access device 116 and a distribution node 104. For example, connections 112 and 114 may be any suitable type of Ethernet interfaces. In particular embodiments, connections 112 or 114 are each one or more Gigabit (1 Gb) Ethernet or 10 Gigabit (10 Gb) Ethernet cables.

The depiction of connection 114a as a solid line represents that connection 114a is acting as a primary connection and the depiction of connection 112a as a dotted line represents that connection 112a is acting as a backup connection. As will be explained in further detail below, these roles may be reversed or shared in certain situations. Connection 112a may be designated as a primary connection for all or some of the traffic that passes between access device 116a and a distribution node 104. If connection 112a is designated as a primary connection for some of the traffic, connection 114a may be designated as the primary connection for the rest of the traffic (or a portion thereof). In particular embodiments, access devices 116 are configured to route traffic across the primary connection assigned to that traffic and to not route (e.g., block) traffic across the backup connection assigned to that traffic.

System 100 may also include any suitable number of distribution node pairs coupled to edge routers 128. A distribution node pair includes two distribution nodes 104. Distribution nodes 104 are operable to bridge traffic (e.g., data link layer frames) between access devices 116 and one or more edge routers 128. As an example, distribution node 104a may receive a data link layer frame from access device 116a and forward the data link layer frame through edge router 128a towards the eventual recipient host 120 of the data link layer frame. As another example, distribution node 104a may receive a data link layer frame that is addressed to host 120a from edge router 128a and forward the data link layer frame to host 120a through access device 116a.

Distribution node 104 may be any suitable device, such as a bridge, switch, or other suitable communication device. As explained above, distribution nodes 104 maintain connections 112 and 114 with a plurality of access devices 116 that facilitate communication between the access devices and the distribution nodes. Distribution node 104 may be coupled to any suitable number of access devices 116. Distribution nodes 104 may function in pairs to provide redundant connections between access devices 116 and network 136 or sites 108b and 108c.

In particular embodiments, one distribution node of each distribution node pair is connected to an edge router and the other distribution node of each pair is connected to a different edge router. For example, as depicted, distribution node 104a is connected to edge router 128a via connection 132a and distribution node 104b is connected to edge router 128b via connection 124a. Various distribution node pairs (such as those formed by distribution nodes 104c-104z) may be coupled to edge routers 128a and 128b in a similar manner. Connections 124 and 132 may each represent one or more suitable media for transferring data between a distribution node 104 and an edge router 128. For example, a connection 124 or 132 may comprise any suitable number of Ethernet interfaces. In particular embodiments, each connection 124 or 132 is one or more Gigabit (1 Gb) Ethernet or 10 Gigabit (10 Gb) Ethernet cables.

The depiction of connection 132 as a solid line represents that connection 132 is acting as a primary connection and the depiction of connection 124 as a dotted line represents that connection 124 is acting as a backup connection. As will be explained in further detail below, these roles may be reversed or shared in certain situations. In particular embodiments, connection 132 may be designated as a primary connection for all or some of the traffic that passes between an access device 116 and an edge router 128. If connection 132 is designated as a primary connection for some of the traffic, connection 124 may be designated as the primary connection for the rest of the traffic (or a portion thereof). In particular embodiments, traffic that travels through network 136 and is destined for a host 120 of site 108a will be forwarded across the primary connection (in this case connection 132) rather than the backup connection (connection 124). In particular embodiments, if a distribution node 104 receives traffic that should be forwarded to an edge router 128, but the distribution node's respective connection (124 or 132) is not the primary connection for the traffic, the traffic may be forwarded through connection 140 to the other distribution node 104 of the pair. The other distribution node 104 may then send that traffic across its respective connection to edge router 128.

Edge routers 128 are operable to bridge or route traffic (e.g., data link layer frames or packets including encapsulated data link layer frames) between distribution nodes 104 and network 136. In particular embodiments, edge router 128 is operable to receive a data link layer frame from a distribution node 104, encapsulate the data link layer frame within a packet (e.g., an IP or Multiprotocol Label Switching (MPLS) based packet), and route the packet towards the destination address of the data link layer frame (e.g., through one or more routers of network 136). Similarly, edge router 128 may be operable to receive a packet from network 136, decapsulate a data link layer frame from the packet, and forward the data link layer frame towards the host 120 specified as the destination in the data link layer frame.

Edge router 128 may be any suitable device for bridging and routing traffic. In particular embodiments, edge routers 128 may function in pairs to provide hosts 120 with redundant access to network 136 and/or sites 108b or 108c. In some embodiments, one edge router 128 of an edge router pair is connected to one distribution node 104 of each of a plurality of distribution node pairs (e.g., through connections 132), and the other edge router of the edge router pair is connected to the other distribution node 104 of each of the distribution node pairs (e.g., through connections 124). Through these connections, the edge router pair may have a primary connection with each distribution node pair and a backup connection with each distribution node pair. The edge router pair may be coupled to any suitable number of distribution node pairs. In the embodiment depicted, the edge routers 128 are configured with a connection 144 between themselves and connections to network 136. For example, edge router 128a is connected to network 136 via connection 148 and edge router 128b is connected to network 136 via connection 152.

In the embodiment depicted, hosts 120, access routers 116, distribution nodes 104 and edge routers 128 collectively constitute site 108a. A site may include a domain in which the hosts 120 of the domain are interconnected and communicate with each other via data link layer frames. In particular embodiments, a data link layer frame may be communicated between any two hosts 120 of a common site 108 without being encapsulated within a packet of another protocol. As an example, data link layer frames between hosts of the same site 108a may be delivered without using routing functions such as IP routing or MPLS labeling. Rather, the data link layer frames are bridged or forwarded by one or more bridges or switches of the site to the destination host 120.

Sites 108 may each represent a data center that is geographically dispersed from one or more other sites 108. In order for a host 120 of site 108a to communicate with a host of a different site (such as site 108b), the communication must travel through network 136. This generally requires encapsulating the data link layer frames within a high lever protocol (such as IP or MPLS) and routing or otherwise transporting the data link layer frames across the network to an edge router 128 of the other site 108b, where the data link layer frames are decapsulated and forwarded to the appropriate host 120.

In particular embodiments, a host 120 may be a member of one or more VLANs. A VLAN may include a group of hosts 120 that communicate as if they were attached to the same site, regardless of their physical location. Thus, if a host 120 broadcasts a data link layer frame to members of a particular VLAN, the data link layer frame is received by all members of that VLAN, whether the member resides in the same site 108 or a different site. In the embodiment depicted, a particular VLAN may include members from various sites 108. Thus, a host 120 of site 108a may be a member of the same VLAN as a host 120 of site 108b. In particular embodiments, data link layer frames include a VLAN tag that identifies the VLAN that the traffic is associated with.

Various connections of system 100 may be assigned to carry traffic associated with particular VLANs. As an example, connections 114, 112, 140, 132, 124, and 144 may each be assigned to carry traffic associated with a respective set of VLANs. In various embodiments, traffic that is associated with a VLAN that is not one of the VLANs that the connection is assigned to carry is not allowed to travel through the connection. In particular embodiments, a connection, such as 114, 112, 132, or 124 may be designated as a primary connection or backup connection for a particular group of VLANs. As an example, connections 114a and 132a may be assigned as primary connections for VLANs 1-300 and connections 112a and 124a may be assigned as primary connections for VLANs 301-600. In such a scenario, connections 114a and 132a may also be assigned as backup connections for VLANs 301-600 and connections 112a and 124a may be assigned as backup connections for VLANs 1-300.

Network 136 of system 100 represents any suitable network operable to facilitate communication between the components of system 100, such as hosts 120, access devices 116, distribution nodes 104 and edge routers 128. Network 136 may include any interconnecting system capable of transmitting audio, video, signals, data, messages, or any combination of the preceding. Network 136 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components. In a particular embodiment, at least a portion of network 136 transmits data link layers frames encapsulated according to an IP or MPLS protocol.

As depicted in FIG. 1, system 100 includes various network devices, including hosts 120, access devices 116, distribution nodes 104, and edge routers 128. Any of these network devices may include one or more portions of one or more computer systems. In particular embodiments, one or more of these computer systems may perform one or more steps of one or more methods described or illustrated herein. The one or more computer systems may provide functionality described or illustrated herein. In some embodiments, encoded software running on the one or more computer systems may perform one or more steps of one or more methods described or illustrated herein and/or provide functionality described or illustrated herein.

The components of the one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed, span multiple locations, span multiple machines, or reside in a cloud, which may include one or more cloud components in one or more networks.

A computer system may include a processor, memory, storage, one or more communication interfaces, and a display in particular embodiments. As an example, distribution node 104 comprises a computer system that includes one or more processors 156, memory 160, storage 164, and one or more communication interfaces 144. These components may work together in order to provide functionality described herein.

Processor 156 may be a microprocessor, controller, or any other suitable computing device, resource, or combination of hardware, stored software and/or encoded logic operable to provide, either alone or in conjunction with other components of distribution node 104 (or other network device), distribution node functionality. In some embodiments, distribution node 104 (or other network device) may utilize multiple processors to perform the functions described herein.

Memory 160 and/or storage 164 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 160 and/or storage 164 may store any suitable data or information utilized by node 104 (or other network device), including software embedded in a computer readable medium, and/or encoded logic incorporated in hardware or otherwise stored (e.g., firmware). Memory 160 and/or storage 164 may also store the results and/or intermediate results of the various calculations and determinations performed by processor 156.

Communication interface 168 may be used for the communication of signaling and/or data between distribution node 104 (or other network device) and one or more networks and/or other network devices. For example, communication interface 168 may be used to send and receive data link layer frames. Each communication interface 168 may send and receive data and/or signals according to a distinct standard such as Asynchronous Transfer Mode (ATM), Frame Relay, or Gigabit Ethernet (or other IEEE 802.3 standard).

System 100 provides a redundant and scalable network structure for connecting VLANs across geographically dispersed sites 108. In particular embodiments, the structure of system 100 also allows for spanning tree protocol (STP) isolation between sites 108. This means that site 108a (or a portion thereof) may implement an instance of STP, and another site 108b (or a portion thereof) may implement a separate instance of STP. Implementing separate STP instances rather than a single instance provides many advantages including quicker network convergence upon failures in system 100 and decreased management complexity (e.g., topology changes in one site 108a do not have to be sent to the other site 108b or 108c).

The configuration of system 100 allows control and tracking mechanisms that are typically performed by edge routers 128 to be performed by distribution nodes 104. This eases the burden on the edge routers 128, especially in networks where there are large numbers of distribution nodes 104 coupled to each edge router 128. As an example, the distribution nodes 104 may provide the functionality required to adjust for a failure of an edge router 128, a distribution node 104, or a connection between a distribution node and an edge router (132 or 124). In a particular embodiment, where VPLS is used as an L2 transport solution, the task of synchronizing the VPLS nodes (edge routers 128a and 128b) may be performed by the distribution nodes 104.

System 100 provides a multi-chassis flexlink architecture for a site 108. In a traditional flexlink implementation, an access device 116 is coupled to two redundant distribution nodes 104. In such implementations, a connection to one of the distribution nodes 104 may serve as a primary connection and a connection to the other distribution node 104 may serve as a backup connection. If the primary connection fails (i.e., the distribution node 104 fails or the connection itself fails) the access device 116 can activate the backup connection and continue forwarding traffic. Thus, in the traditional flexlink implementation, two distribution nodes are connected to the same access device. In the multi-chassis flexlink architecture, two devices are connected to two separate devices. For example, a primary connection couples a distribution node 104a to an edge router 128a and a backup connection couples distribution node 104b to edge router 128b. Moreover, in the multi-chassis flexlink architecture shown, the connections are between the distribution layer and the core layer rather than the access layer and the distribution layer.

In particular embodiments, the distribution nodes 104 of a distribution node pair may implement a route-watch semaphore to ensure that one of the distribution nodes 104 is operating as the primary distribution node for particular traffic. If distribution node 104a is the primary distribution node, the connections 114a-114n between distribution node 104a and the access devices 116a-116n are designated as primary connections and the connection 132a is also designated as a primary connection). In various embodiments, a distribution node 104 serves as the primary distribution node for all data link layer frames sent to the distribution layer from access devices 116a-116n. In other embodiments, a distribution node 104 serves as the primary distribution node for traffic associated with (e.g., including tags identifying) one or more designated VLANs.

The backup distribution node is operable to determine, via the route-watch semaphore, if the primary distribution node itself (distribution node 104a in this case), its connection (132a) to its respective edge router 128a, or the edge router has failed. In particular embodiments, the semaphore may be propagated by a routing protocol (such as an IP protocol) implemented by edge routers 128. In response to a detection that the primary distribution node is unavailable to forward traffic to its respective edge router 128, the backup distribution node 104b assumes the role of the primary distribution node and activates its backup connection (connection 124a) to serve as a primary connection. In particular embodiments, upon assuming the role of the primary distribution node, distribution node 104b performs dynamic VLAN assignment on one or more of the connections. For example, distribution node 104b may specify that traffic for particular VLANs will be sent on connection 124a. In particular embodiments, distribution node 104b also initiates local MAC flushing within site 108a upon assuming the role of the primary distribution node. This may include sending instructions to access devices 116a-n to erase bridging or forwarding tables stored by the access devices. This will result in the access devices 116a-n building new bridging tables that specify that data link layer frames should be forwarded through connections 112a-n (now acting as primary connections) to distribution node 104b. In particular embodiments, the dynamic VLAN assignments and the initiation of the MAC flushing may be performed by executing a script at the distribution node 104. In other embodiments, software integrated with the distribution node performs these functions.

Figure 2:
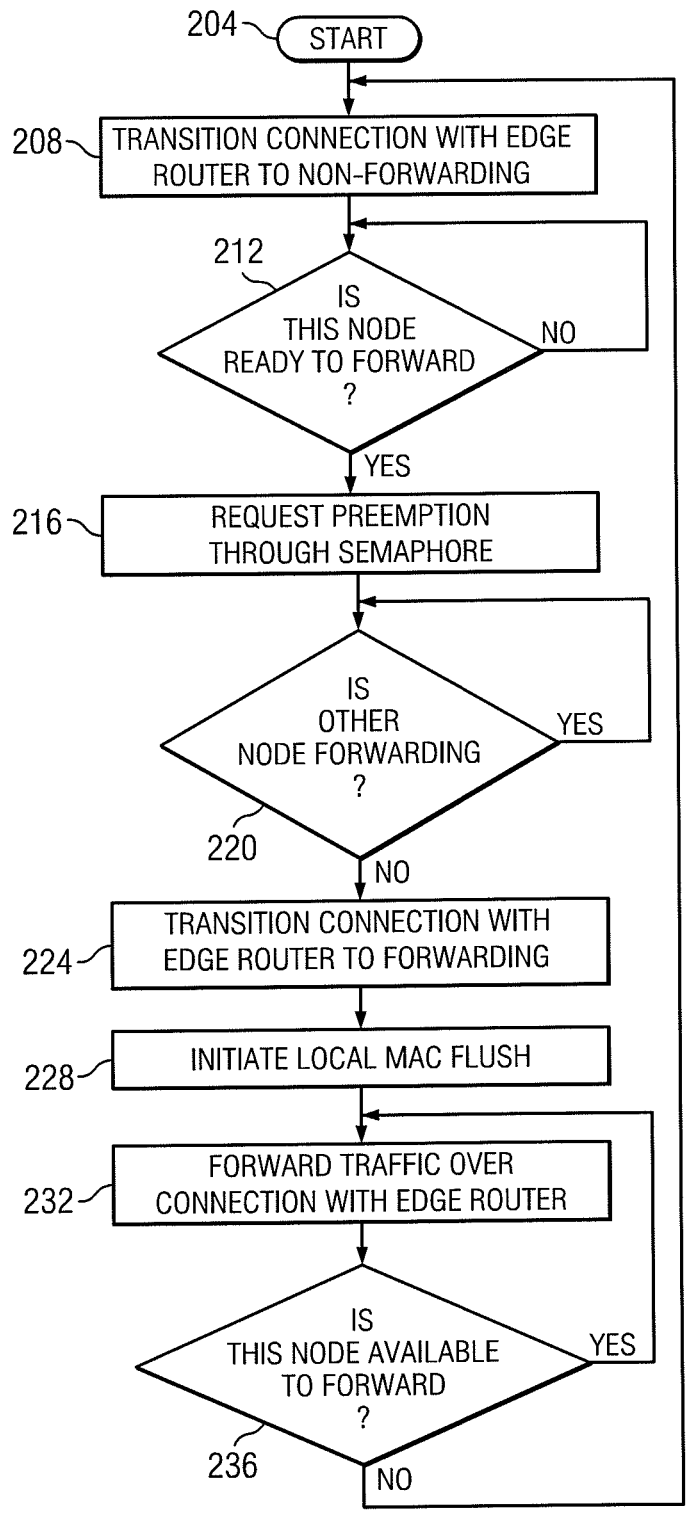
FIG. 2 depicts an example method for implementing a distribution layer redundancy scheme for coupling geographically dispersed sites that may be performed by a distribution node of FIG. 1.

FIG. 2 depicts an example method 200 that may be performed by system 100 for implementing a distribution layer redundancy scheme for coupling geographically dispersed sites 108. The method is described from the point of view of distribution node 104a, though it could be performed by any distribution node configured as a primary distribution node by default (such as distribution nodes 104c or 104y). Each step of the method may be performed with respect to one or more VLANs or all data link layer traffic (e.g., a distribution node may perform these steps for certain VLANs while performing other steps for other VLANs).

The method begins at step 204. At step 208, connection 132a between the distribution node 104a and the edge router 128a is configured to not forward traffic. For example, distribution node 104a may bring the connection up, but not forward data link layer packets to edge router 128a through connection 132a. In particular embodiments, step 208 may include updating a VLAN forwarding database associated with distribution node 104a to indicate that traffic associated with one or more VLANs should not be forwarded through connection 132a. Step 208 may be performed while the distribution node 104a is booting or otherwise unavailable to forward traffic in order to avoid blackholing traffic.

At step 212, distribution node 104a determines whether it is ready to forward traffic across connection 132a (i.e., act as the primary connection). Distribution node 104a may periodically perform this step. Once distribution node 104a is ready to forward traffic, it requests preemption through a semaphore. This may include sending one or more messages to distribution node 104b to notify distribution node 104b that distribution node 104a will be assuming the role of the primary distribution node.

At step 220, distribution node 104a determines whether distribution node 104b is forwarding traffic across its connection 124a to edge router 128b. In particular embodiments, distribution node 104a determines whether distribution node 104b is forwarding by monitoring the availability on an IP address of distribution node 104b through connections 132a, 144, and 124a. If distribution node 104b is forwarding, distribution node 104a may wait a predetermined period of time and then check again. After it is determined that distribution node 104b is not forwarding, distribution node 104a transitions connection 132a to forward traffic to edge router 128a at step 224. In particular embodiments, step 224 may include updating the VLAN forwarding database associated with distribution node 104a to indicate that traffic associated with one or more VLANs should be forwarded through connection 132a.

At step 228, a local MAC flush is initiated. Because the network topology may have changed (e.g., distribution node 104b has stopped forwarding traffic to edge router 128b via connection 124a for one or more VLANs), access devices 116 should rebuild their bridging tables so that traffic is forwarded through the best path. For example, data link layer frames that are destined for a remote site 108b or 108c should now be sent through distribution node 104a and edge router 128a rather than distribution node 104b and edge router 128b. Accordingly, the bridging tables included on access devices 116 are reset so that the access devices 116 may learn the correct forwarding paths. In a particular embodiment, distribution node 104a initiates a MAC flush at each access device 116a-116n. As an example, distribution node 104b may send a message, such as a topology change notification (TCN), to each access device 116 through connections 112a-n indicating that the bridging table of the access device should be erased. The access devices 116 erase their bridging tables (e.g., flush their Content addressable memory (CAM) tables) in response to receiving this message. In particular embodiments, distribution node 104a initiates this process itself without receiving a message from edge router 128a to begin the MAC flush.

In particular embodiments, other steps may be taken in order to facilitate optimal routing in the event of network topology changes. As an example, the STP root and Hot Standby Routing Protocol (HSRP) active roles may be configured to be the same distribution node 104 that is serving as the primary distribution node for any given VLANs. As another example, the STP root secondary and HSRP standby roles may be configured to be the same distribution node 104 that is serving as the backup distribution node for the same VLANs.

At step 232, data link layer traffic is forwarded to edge router 128a across connection 132a. For example, distribution node 104a may receive data link layer frames from access devices 116a-n or distribution node 104b that are destined for a host 120 at a remote site 108b and forward the frames to edge router 128a. In addition, distribution node 104a may receive data link layer frames from edge router 128a and forward the frames towards the destination host 120 via the proper access device 116. At step 236, it is determined whether distribution node 104a is still available to forward traffic to edge router 128a. If it is still available, traffic forwarding continues at step 232. If it is not available, connection 132a with edge router 128a is transitioned to non-forwarding (i.e., backup) at step 208 and the method repeats.

Method 200 may include more, fewer, or other steps. Additionally, steps may be performed in any suitable order. In particular embodiments, any distribution node 104 may be operable to perform any appropriate steps of method 200.

Figure 3:
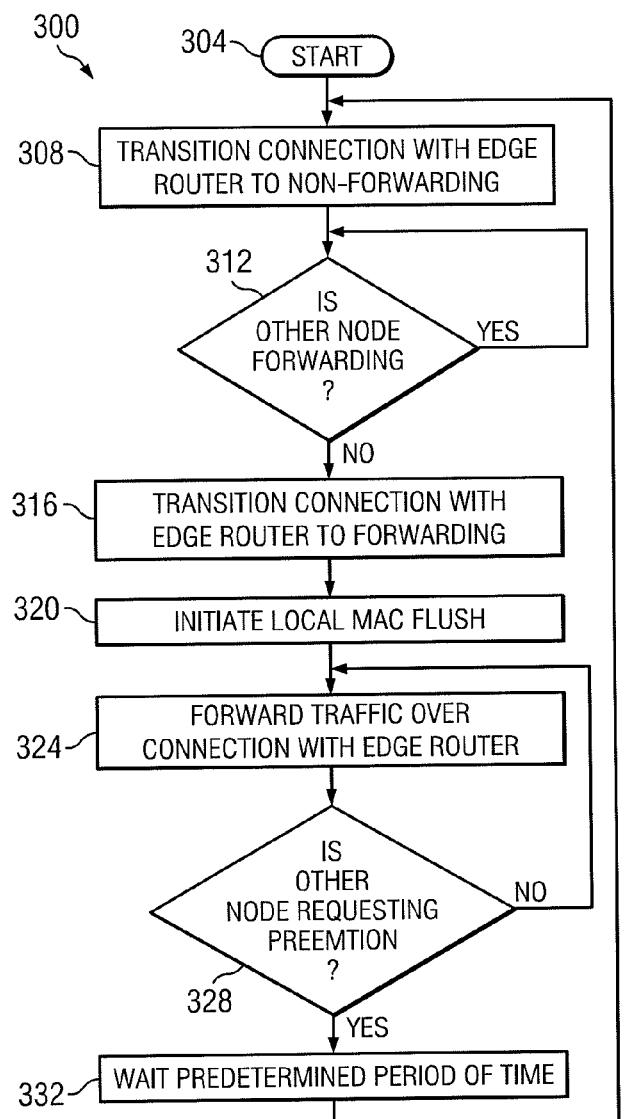
FIG. 3 depicts an example method for implementing a distribution layer redundancy scheme for coupling geographically dispersed sites that may be performed by a different distribution node of FIG. 1.

FIG. 3 depicts an example method 300 that may be performed by system 100 for implementing a distribution layer redundancy scheme for coupling geographically dispersed sites 108. The method is described from the point of view of distribution node 104b, though it could be performed by any distribution node configured as a backup distribution node by default (such as distribution nodes 104d or 104z). Each step of the method may be performed with respect to one or more VLANs or all data link layer traffic.

The method begins at step 304. At step 308, connection 124a between distribution node 104b and edge router 128b is configured to not forward traffic. For example, distribution node 104b may bring (or leave) the connection up, but not forward data link layer packets to edge router 128b through connection 124a. In particular embodiments, step 308 may include updating a VLAN forwarding database associated with distribution node 104b to indicate that traffic associated with one or more VLANs should not be forwarded through connection 124a.

At step 312, it is determined whether the other distribution node 104a of the distribution node pair is forwarding traffic on its connection 132a to edge router 128a. Distribution node 104b may periodically monitor the availability of distribution node 104a to forward traffic. In a particular embodiment, distribution node 104b may determine that distribution node 104a is available to forward traffic if distribution node 104a is reachable through edge routers 128a and 128b. For example, distribution node 104b may determine whether an address of distribution node 104a (such as an IP address) advertised by distribution node 104a is available through edge routers 128a and 128b (e.g., a routing protocol may cause the address to be propagated from distribution node 104a to edge router 128a to edge router 128b). As another example, distribution node 104a may periodically send a message to distribution node 104b through edge routers 128a and 128b indicating that distribution node 104a is available to function as the primary distribution node.

In some embodiments, distribution node 104b monitors the reachability of the primary distribution node 104a through the edge routers 128b and 128a, rather than its connection 140 with primary distribution node 104a. Such an implementation allows distribution node 104b to determine that if the distribution node 104a is not reachable via this route, then either the primary distribution node 104a itself has failed, the edge router 128a has failed, or the connection 132a between the two has failed. Since any of these conditions make distribution node 104a unfit to forward traffic, the distribution node 104b will assume the role of the primary distribution node (i.e. it will forward traffic over connection 124a) upon detection that distribution node 104a is no longer reachable through edge routers 128a and 128b. If distribution node 104b were to monitor the reachability of distribution node 104a via connection 140, it would only be able to detect a failure of the distribution node 104a itself and not a failure of connection 132a or edge router 128a without an additional failure detection mechanism.

After it is determined that distribution node 104a is not forwarding, distribution node 104b transitions connection 124a to forward traffic to edge router 128b at step 316. In particular embodiments, step 316 may include updating a VLAN forwarding database associated with distribution node 104b to indicate that traffic associated with one or more VLANs should be forwarded through connection 124a.

At step 320, a MAC flush is initiated. Because the network topology has changed (e.g., edge router 128a is now unreachable through distribution node 104a), access devices 116 should rebuild their bridging tables so that traffic is forwarded through the best path. For example, data link layer frames that are destined for a remote site 108b or 108c should now be sent through distribution node 104b and edge router 128b rather than distribution node 104a and edge router 128a. Accordingly, the bridging tables included on access devices 116 are reset so that the access devices 116 may learn the correct forwarding paths. In a particular embodiment, distribution node 104b initiates a MAC flush at each access device 116a-116n. As an example, distribution node 104b may send a message, such as a topology change notification (TCN), to each access device 116 through connections 112a-n indicating that the bridging table of the access device should be erased. The access devices 116 erase their bridging tables (e.g., flush their MAC tables) in response to receiving this message. In particular embodiments, distribution node 104b initiates this process itself without receiving a message from edge router 128b to begin the MAC flush.

In particular embodiments, other steps may be taken in order to facilitate optimal routing in the event of network topology changes. As an example, the STP root and Hot Standby Routing Protocol (HSRP) active roles may be configured to be the same distribution node 104 that is serving as the primary distribution node for any given VLANs. As another example, the STP root secondary and HSRP standby roles may be configured to be the same distribution node 104 that is serving as the backup distribution node for the same VLANs.

At step 324, data link layer traffic is forwarded to edge router 128b across connection 124a. For example, distribution node 104b may receive data link layer frames from access devices 116a-n or distribution node 104a that are destined for a host 120 at a remote site 108b and forward the frames to edge router 128b. In addition, distribution node 104b may receive data link layer frames from edge router 128b and forward the frames towards the destination host 120 via the proper access device 116. At step 328, it is determined whether distribution node 104a is requesting preemption. If distribution node 104a is not requesting preemption, traffic forwarding continues at step 324. If distribution node 104a is requesting preemption, connection 124a with edge router 128b is transitioned to non-forwarding (i.e., backup) at step 308 and the method repeats. In particular embodiment, distribution node 104b may wait a predetermined period of time before transitions its connection 124a to non-forwarding in order to provide adequate time for distribution node 104a to prepare to forward in order to avoid traffic forwarding errors.

In an alternative embodiment, while distribution node 104b is forwarding traffic, it may also monitor the availability of distribution node 104a. This monitoring may be similar to the monitoring described above in connection with step 312. If distribution node 104a is not available, distribution node 104b continues to serve as the primary distribution node. In particular embodiments, in response to a determination that distribution node 104a is again available to serve as the primary distribution node, distribution node 104b determines whether to continue serving as the primary distribution node or to allow distribution node 104a to resume service as the primary distribution node. In various embodiments, a preferred distribution node is specified, and if both distribution nodes 104 are available, the preferred distribution node will serve as the primary distribution node when both distribution nodes are available to forward traffic. In other embodiments, a distribution node serves as the primary distribution node until it is unavailable to do so, regardless of whether the other distribution node of the distribution node pair is available to serve as the primary distribution node.

Method 300 may include more, fewer, or other steps. Additionally, steps may be performed in any suitable order. In particular embodiments, any distribution node 104 may be operable to perform any appropriate steps of method 300.

In particular embodiments, a single distribution node (e.g. distribution node (e.g., distribution node 104a) serves as a primary distribution node for a first set of VLANs and a backup distribution node for a second set of VLANs. For example, distribution node 104a may forward data link layer frames associated with VLANs 1-300 from access devices 116a-n through connection 132a. Distribution node 104a may be configured to not forward data link layer frames associated with VLANs 301-600 through connection 132a but may forward such data link layer frames through connection 140 to distribution node 104b. Distribution node 104b may forward data link layer frames associated with VLANs 301-600 from access devices 116 a-n through connection 124a. Distribution node 104b may be configured to not forward data link layer frames associated with VLANs 1-300 through connection 124a, but may forward such data link layer frames through connection 140 to distribution node 104a. Each distribution node 104 may monitor whether the other distribution node is forwarding through its respective connection 132a or 124a. If the other distribution node is not forwarding, the respective distribution node will then assume the role of the primary distribution node for the traffic that the other distribution node was forwarding. For example, if distribution node 104b stopped forwarding traffic over connection 124a, distribution node 104a may begin forwarding traffic associated with VLANs 1-600 across connection 132a.

The architecture and methods described herein may function independently of the connectivity scheme between the access devices 116 and the distribution nodes 104. As examples, this connectivity may be STP, traditional flexlink, or virtual Port Channel (vPC). For example, access devices 116a-116n may be connected to distribution nodes 104a and 104b using STP, where the port or ports of the access device 116 that interface with the primary connection (which could be connection 112 or 114 depending on which distribution node 104 is functioning as the primary distribution node) are set to forwarding, and the port or ports of the access device 116 that interface with the backup connection are set to blocking. This may facilitate a loop-free topology. As another example, access devices 116a-116n may be connected to distribution nodes 104a and 104b using tradition flexlink, where the port or ports of the access device 116 that interface with the primary connection are set as active (i.e., available to forward traffic) and the port or ports of the access device that interface with the backup connection are put in a standby state (i.e., not available to forward traffic).

Figure 4:
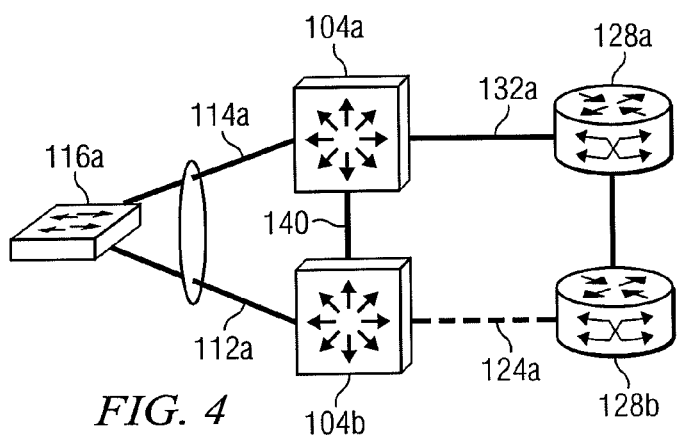
FIG. 4 depicts an example configuration of an access device and a distribution node pair of FIG. 1 that implements a distribution layer redundancy scheme.

FIG. 4 depicts a portion of system 100 in which the connectivity between the access device 116a and the distribution nodes 104 is based on the vPC protocol. According to the vPC protocol, access device 116a may form a virtual port channel 156 with distribution nodes 104. The virtual port channel 156 may include two physically separate connections 114a and 112a bundled together as a single logical channel. This allows load balancing across the connections without introducing loops in the network. In the vPC protocol, the distribution nodes 104 act as a vPC peer endpoint that appears as a single logical entity to the access device 116a.

The architecture and methods described herein may also function independently of the core transport technology used in network 136 to sites 108 together. For example, the data link layer frames may be encapsulated and transported across network 136 via an IP, MPLS, or other suitable protocol, such as a layer 3 protocol of the OSI model. Various embodiments are compatible with Virtual Private LAN Service (VPLS), Hierarchical VPLS (H-VPLS), 802.1ah, 802.1ad, 802.1Q, or other methods of transport.

In particular embodiments, load repartition can be achieved via a VLAN load-balancing feature so that traffic for mutually exclusive VLANs is split across connections 112 and 114. In such embodiments, traffic across connection 112 may be forwarded by distribution node 104b to edge router 128b via connection 124a and traffic across connection 114 may be forwarded by distribution node 104a to edge router 128a via connection 132a. If connection 114, distribution node 104a, connection 132a, or edge router 128a becomes unavailable, distribution node 104b is operable to bridge traffic for the VLANs that were previously assigned to be forwarded through distribution node 104a.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising: providing a plurality of first connections, each first connection of the plurality of first connections coupling a first distribution node of a first site to a respective access device of a plurality of access devices of the first site, each access device coupled to one or more hosts of the first site; configuring a second connection between the first distribution node and a first edge router to not forward traffic associated with a first set of one or more virtual local area networks (VLANs); determining, by a semaphore communicated with a second distribution node over the second connection, a third connection connecting the first edge router and a second edge router, and a fourth connection connecting the second edge router to the second distribution node, whether the second distribution node is reachable from the first distribution node through the first edge router and the second edge router, the second distribution node configured to forward traffic associated with the first set of one or more VLANs across the fourth connection to the second edge router while the first distribution node forwards traffic associated with a second set of one or more VLANs across the second connection to the first edge router; configuring the second connection to forward traffic associated with the first set of one or more VLANs in response to a determination that the second distribution node is unreachable through the first edge router and the second edge router; and forwarding traffic associated with the first set of one or more VLANs across the second connection to the first edge router.

2. The method of claim 1, further comprising initiating a media access control (MAC) address flush by each access device of the plurality of access devices in response to the determination that the second distribution node is unreachable through the first edge router and the second edge router.

3. The method of claim 1, further comprising receiving, from the first edge router, data link layer frames originating from a plurality of hosts of a second site coupled to the first site through an Internet Protocol (IP) network, wherein the plurality of hosts are each a member of at least one of the first set of one or more VLANs.

4. The method of claim 1, further comprising configuring the second connection between the first distribution node and the first edge router to stop forwarding traffic associated with the first set of one or more VLANs in response to a determination that the second distribution node is again reachable through the first edge router and the second edge router.

5. The method of claim 1, further comprising advertising, by the first distribution node to the second distribution node, the availability of the first distribution node to forward traffic to the first edge router.

6. The method of claim 1, wherein: the first edge router is configured to encapsulate data link layer frames received from the first distribution node and transmit the encapsulated data link layer frames through an Internet Protocol (IP) network to a second site;
and the second edge router is configured to encapsulate data link layer frames received from the second distribution node and transmit the encapsulated data link layer frames through the IP network to the second site.

7. A first distribution node of a first site, the first distribution node comprising: a memory configured to store computer executable instructions; and one or more processors coupled to the memory, the processors configured, when executing the instructions, to: establish a plurality of first connections, each first connection of the plurality of first connections coupling a first distribution node of a first site to a respective access device of a plurality of access devices of the first site, each access device coupled to one or more hosts of the first site; configure a second connection between the first distribution node and a first edge router to not forward traffic associated with a first set of one or more virtual local area networks (VlANs); determine, by a semaphore communicated with a second distribution node over the second connection, a third connection connecting the first edge router and a second edge router, and a fourth connection connecting the second edge router to the second distribution node, whether the second distribution node is reachable from the first distribution node through the first edge router and the second edge router, the second distribution node configured to forward traffic associated with the first set of one or more VLANs across the fourth connection to the second edge router while the first distribution node forwards traffic associated with a second set of one or more VLANs across the second connection to the first edge router; configure the second connection to forward traffic associated with the first set of one or more VLANs in response to a determination that the second distribution node is unreachable through the first edge router and the second edge router; and forward traffic associated with the first set of one or more VLANs across the second connection to the first edge router.

8. The first distribution node of claim 7, wherein the one or more processors are further configured to initiate a media access control (MAC) address flush by each access device of the plurality of access devices in response to the determination that the second distribution node is unreachable through the first edge router and the second edge router.

9. The first distribution node of claim 7, wherein the one or more processors are further configured to receive, from the first edge router, data link layer frames originating from a plurality of hosts of a second site coupled to the first site through an Internet Protocol (IP) network, wherein the plurality of hosts are each a member of at least one of the first set of one or more VLANs.

10. The first distribution node of claim 7, wherein the one or more processors are further configured to configure the second connection between the first distribution node and the first edge router to stop forwarding traffic associated with the first set of one or more VLANs in response to a determination that the second distribution node is again reachable through the first edge router and the second edge router.

11. The first distribution node of claim 7, wherein the one or more processors are further configured to advertise, to the second distribution node, the availability of the first distribution node to forward traffic to the first edge router.

12. The first distribution node of claim 7, wherein: the first edge router is configured to encapsulate data link layer frames received from the first distribution node and transmit the encapsulated data link layer frames through an Internet Protocol (IP) network to a second site; and the second edge router is configured to encapsulate data link layer frames received from the second distribution node and transmit the encapsulated data link layer frames through the IP network to the second site.

13. One or more non-transitory computer readable media comprising logic that when executed by one or more processor(s) is operable to: establish a plurality of first connections, each first connection of the plurality of first connections coupling a first distribution node of a first site to a respective access device of a plurality of access devices of the first site, each access device coupled to one or more hosts of the first site; configure a second connection between the first distribution node and a first edge router to not forward traffic associated with a first set of one or more virtual local area networks (VLANs); determine, by a semaphore communicated with a second distribution node over the second connection, a third connection connecting the first edge router and a second edge router, and a fourth connection connecting the second edge router to the second distribution node, whether the second distribution node is reachable from the first distribution node through the first edge router and the second edge router, the second distribution node configured to forward traffic associated with the first set of one or more VLANs across the fourth connection to the second edge router while the first distribution node forwards traffic associated with a second set of one or more VLANs across the second connection to the first edge router; configure the second connection to forward traffic associated with the first set of one or more VLANs in response to a determination that the second distribution node is unreachable through the first edge router and the second edge router; and forward traffic associated with the first set of one or more VLANs across the second connection to the first edge router.

14. The media of claim 13, wherein the logic is further operable to initiate a media access control (MAC) address flush by each access device of the plurality of access devices in response to the determination that the second distribution node is unreachable through the first edge router and the second edge router.

15. The media of claim 13, wherein the logic is further operable when executed to receive, from the first edge router, data link layer frames originating from a plurality of hosts of a second site coupled to the first site through an Internet Protocol (IP) network, wherein the plurality of hosts are each a member of at least one of the first set of one or more VLANs.

16. The media of claim 13, wherein the logic is further operable when executed to configure the second connection between the first distribution node and the first edge router to stop forwarding traffic associated with the first set of one or more VLANs in response to a determination that the second distribution node is again reachable through the first edge router and the second edge router.

17. The media of claim 13, wherein the logic is further operable when executed to advertise, to the second distribution node, the availability of the first distribution node to forward traffic to the first edge router.

\* \* \* \* \*